Nov. 9, 1965    J. C. WHITING ETAL    3,216,571
FLUID FILTER AND INDICATOR THEREFOR
Filed June 25, 1962    4 Sheets-Sheet 1

INVENTORS
JAMES C. WHITING.
THEODORE SCOOROS.
JOSEPH H. GERSCHICK.
BY William N. Antonia
ATTORNEY.

INVENTORS
JAMES C. WHITING.
THEODORE SCOOROS.
JOSEPH H. GERSCHICK
BY- William N. Antonis
ATTORNEY

United States Patent Office 3,216,571
Patented Nov. 9, 1965

3,216,571
FLUID FILTER AND INDICATOR THEREFOR
James C. Whiting, Theodore Scooros, and Joseph H. Gerschick, Madison Heights, Mich., assignors to The Bendix Corporation, Madison Heights, Mich., a corporation of Delaware
Filed June 25, 1962, Ser. No. 204,716
4 Claims. (Cl. 210—90)

This invention relates to a fluid filter and more particularly to a fluid filter and an indicator therefor.

In the past, certain aircraft specifications have required the use of fuel filtering units having two filter elements, two bypass valves and two indicators to indicate valve operation. Such duplication of parts oftentimes resulted in increased costs and cumbersome packages.

Accordingly, it is an object of this invention to provide a fuel filter having a primary filter element and a secondary filter element in which a single bypass valve and indicator are interconnected so as to perform the functions of two separate valves and indicators.

More specifically, it is an object of this invention to provide a novel arrangement for a fuel filtering device in which a primary filter element normally filters all of the fuel flowing through the device, a secondary filter element is brought into operation only after the primary filter becomes clogged with contaminants, a single movable bypass valve is utilized to initially bypass the primary filter element when it becomes clogged and subsequently the secondary filter element after it also becomes clogged, and a single indicator pin is utilized for initially indicating the clogged condition of the primary filter element and subsequently indicating the clogged condition of the secondary filter element.

Another object of this invention is to provide a novel two stage bypass valve for use in conjunction with primary and secondary filter elements, which bypass valve is operatively connected to a two stage signalling device having a first position for indicating the clogged condition of the primary filter element and a second position for indicating the clogged condition of the secondary filter element.

A further object of this invention is to provide a fuel filter and indicator therefor of the type described which will require a relatively small volume and will be relatively inexpensive to fabricate.

The above and other objects and features of the invention will become apparent from the following description of the mechanism taken in connection with the accompanying drawings which form a part of this specification and in which.

Figure 2:
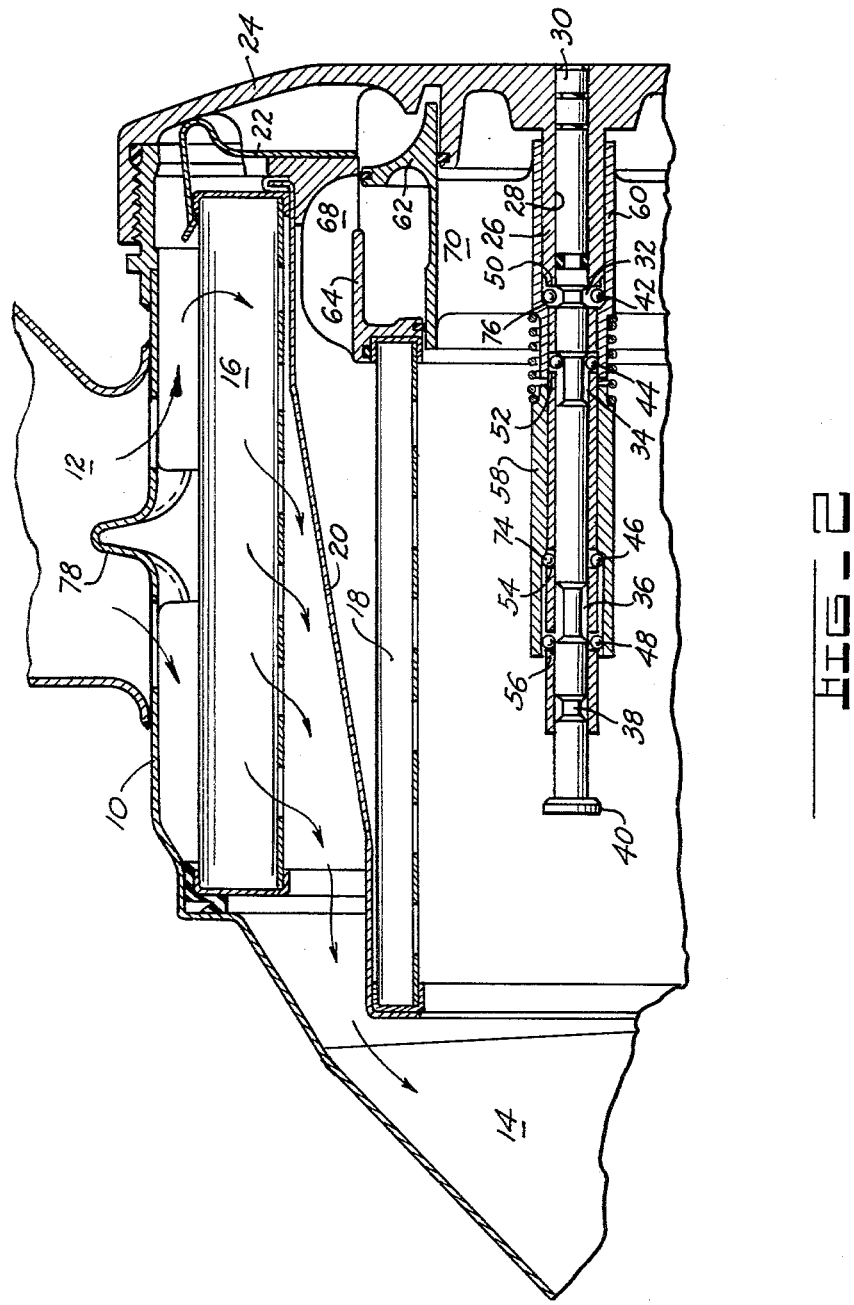
FIGURE 2 is a sectional view of a portion of the device shown in FIGURE 1 in which the indicator pin is still in a non-signalling first position, but the bypass valve is beginnig to move away from its neutral or normal position.
Figure 3:
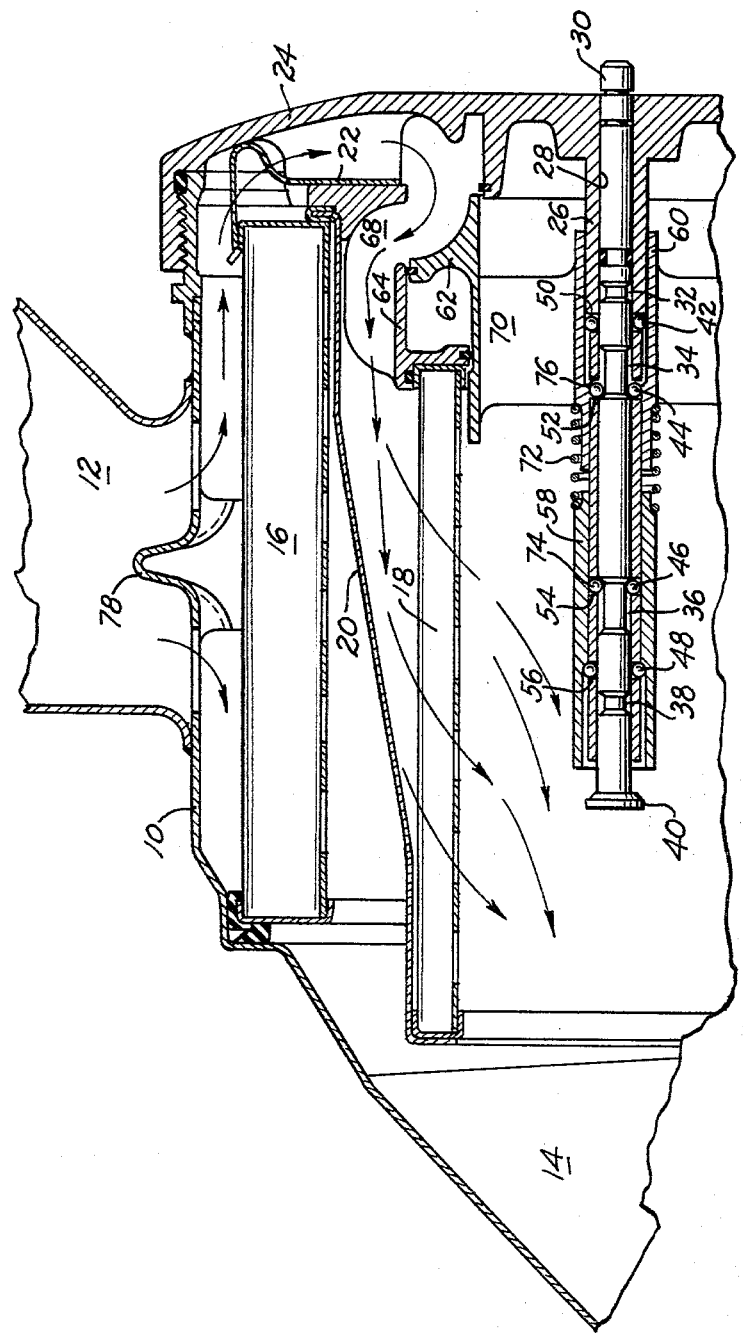
Figure 4:
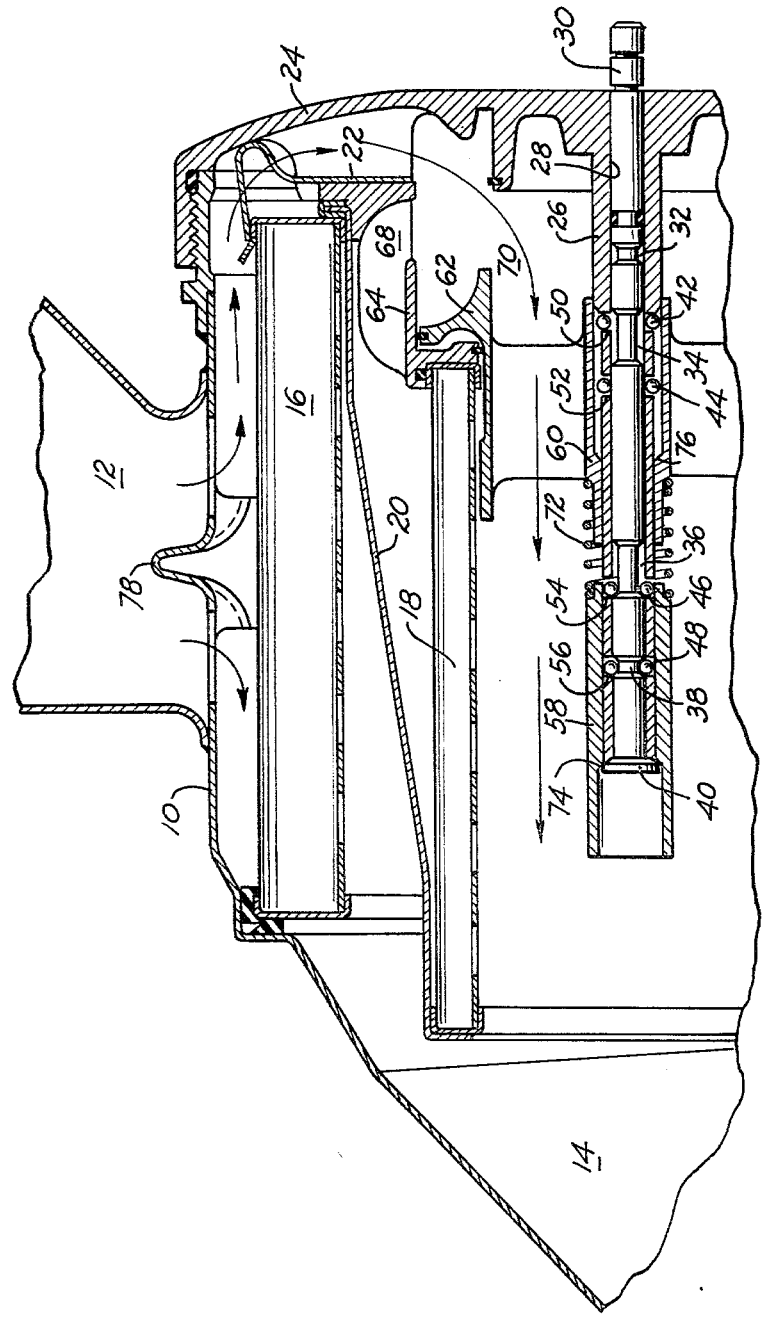

FIGURE 3 is a sectional view similar to that of FIGURE 2 in which the indicator pin has moved to a signalling second position and the bypass valve has moved to a position which permits flow through the secondary filter element; and FIGURE 4 is a sectional view similar to that of FIGURE 2 in which the indicator pin has moved to a signalling third position and the bypass valve has moved to a position which permits the fuel to bypass both the primary and secondary elements.

Figure 1:
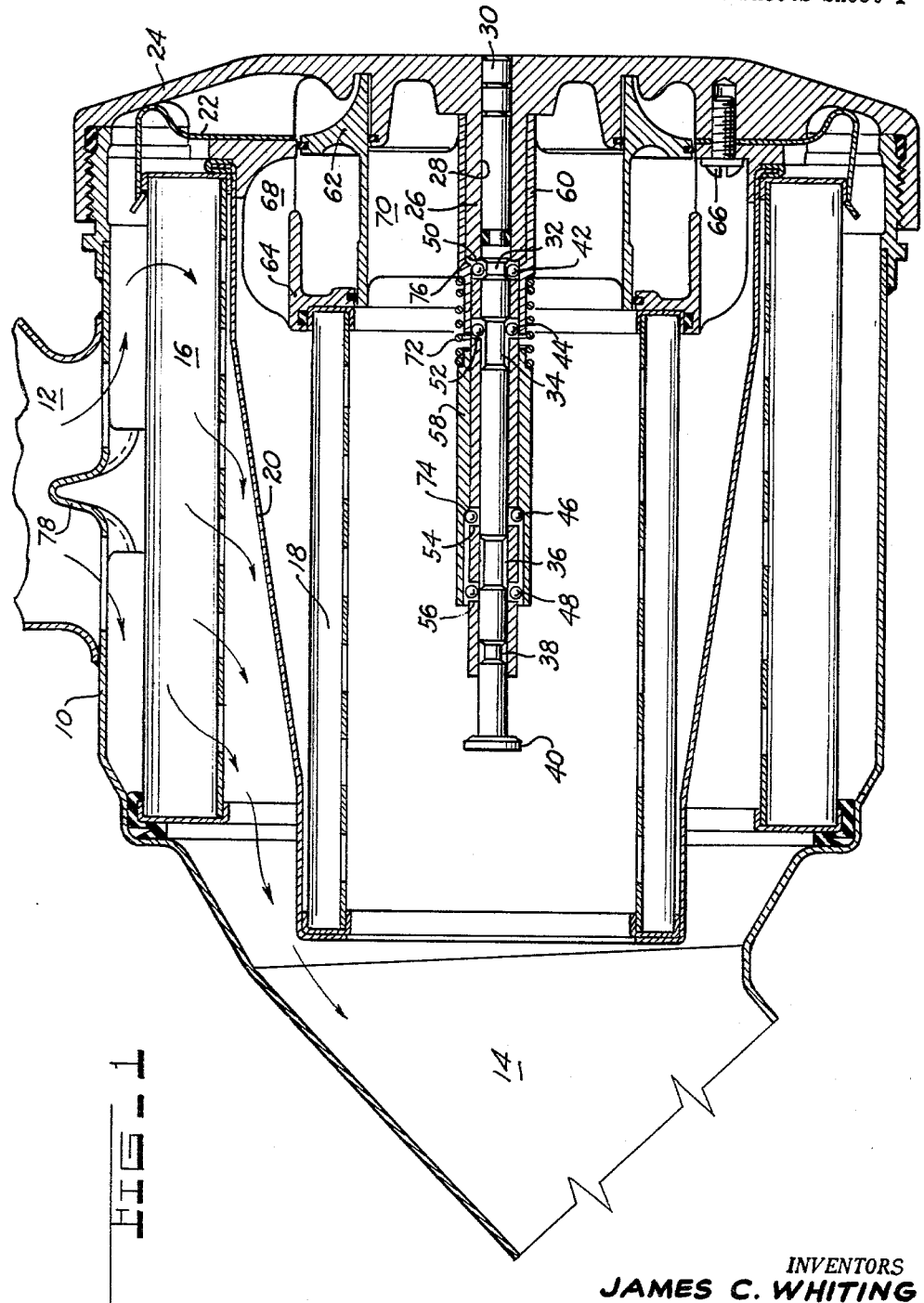
FIGURE 1 is a sectional view of a fuel filtering device incorporating the invention in which the indicator pin is in a non-signalling first position and the bypass valve is in its neutral or normal position.

Referring to FIGURE 1, it will be noted that the device includes a housing 10 having an inlet port 12 and an outlet port 14. A primary filter element 16 of any suitable type is interposed between the inlet and outlet ports for filtering all of the fluid flowing therebetween. Telescoped within the primary element 16 is a secondary filter element 18, also of any suitable type, which filters all of the fluid flowing between the inlet and outlet ports only after the primary filter element becomes clogged with contaminants, as will be hereinafter described. A conical partition 20 which extends from the upper inner periphery of the primary filter element 16 to the lower outer periphery of the secondary filter element 18 prevents flow through these elements in series. Clips 22 are utilized to retain the filter elements to the cover 24 in order to facilitate the installation and removal of the elements. Extending from the cover 24 is a guide member 26 which has a bore 28 extending therethrough.

Located in the bore 28 of the guide member is an indicator pin 30 which has a plurality of annular grooves 32, 34, 36 and 38 formed on the surface thereof and a flange 40 formed at the end thereof. A plurality of balls 42, 44, 46 and 48 are located respectively in slots 50, 52, 54 and 56 of the guide member 26. These balls are held in place by a sleeve 58 and the tubular portion 60 of a bypass valve 62. The bypass valve is slidable within an annular bypass valve body 64 which surrounds the guide member 26 and is suitably connected to the cover 24 through means such as bolts 66, only one of which is shown. A first passage 68 is located in the valve body for permitting bypassing of the primary filter element 16 and communicating the inlet port 12 with the outlet port 14 via the secondary filter element 18. Also located within the valve body is a second passage 70 which allows bypassing of both the primary and secondary filter elements and permits direct communication between the inlet and outlet ports. It will be noted that movement of the bypass valve member 62 is caused by the exertion of predetermined filter inlet pressures acting thereon, said movement being opposed by a spring 72 which is located between the sleeve 58 and the tubular portion 60 of the bypass valve member. It will also be noted that the sleeve 58 and tubular portion 60 of the bypass valve member 62 each have step bores which form shoulders 74 and 76 in the sleeve and tubular portion, respectively, for purposes to be hereinafter described.

Operation of the device will be as follows:

FIGURE 1 shows the relative position of all of the components when flow is occurring through a clean assembly. In this situation fluid enters inlet port 12, passes through primary filter element 16 and passes out of the device through outlet port 14. The deflector 78 prevents direct fluid impingement on the primary filter element.

When the primary filter element 16 becomes clogged with contaminants, initial movement of the ports will be as shown in FIGURE 2. Thus, as the pressure differential across the primary filter element 16 increases, the unbalanced force acting on the bypass valve member 62 causes it to move to the left against the resistance of spring 72. At the same time, system pressure is also acting on the end of indicator pin 30 thereby urging it to move to the right. Sleeve 58 is prevented from moving to the left upon leftward movement of the bypass valve member 62 because shoulder 74 of the sleeve abuts balls 46. However, it will be noted that initial movement of valve member 62 permits balls 42 to move radially outwardly from groove 32 thereby releasing the indicator pin 30 so that it can move to the position shown in FIGURE 3.

Referring to FIGURE 3, it will be seen that although indicator pin 30 has extended to the right, further movement is restricted by balls 44 in groove 34. However, this movement of the indicator pin is sufficient to allow balls 46 to drop into groove 36 thereby permitting sleeve 58 to move to the left until it is stopped by abutment of its shoulder 74 with balls 48. This decreases the spring load tending to close valve member 62 so that it may be opened fully by the small pressure differential which permits flow to pass through the secondary filter element. It will be noted that the indicator pin is locked, in the position shown, by balls 46 in groove 36.

When the primary and secondary filter elements 16 and 18 are both clogged with contaminants, the increased pressure differential will cause the valve member 62 to move to the left, as shown in FIGURE 4. Initial movement of the valve member releases balls 44 from groove 34 thereby permitting the indicator pin to extend fully until flange 40 at the end of the indicator pin abuts the end of the guide member 26. Such movement of the indicator pin also allows balls 48 to drop into groove 38 thereby permitting sleeve 58 to move to the left until shoulder 74 abuts the flange 40 of the indicator pin. This movement of the sleeve releases spring compression and allows the bypass valve to open fully to thereby provide a second bypass flow path. This final movemtnt of the sleeve 58 also locks the indicator pin in the second extended position since balls 48 are now in groove 38.

One of the advantages of the previously described arrangement is that in order to reset the indicating device, the sleeve and valve must be returned to their initial positions before the indicator pin may be retracted. This can only be done by first removing the contaminated primary and secondary filter elements.

Although this invention has been described in connection with a specific embodiment, it will be obvious to those skilled in the art that various changes may be made in the form, structure and arrangement of parts without departing from the spirit of the invention. Accordingly, applicants do not desire to be limited to the specific embodiment disclosed herein primarily for purposes of illustration, but instead desire protection falling within the scope of the appended claims.

Having thus described the various features of the invention, what we claim as new and desire to secure by Letters Patent is:

1. A fluid filter comprising a housing having an inlet port and an outlet port, a fixed substantially cylindrical primary filter element interposed between said inlet and outlet ports for filtering all of the fluid flowing therebetween, a fixed substantially cylindrical secondary filter element interposed between said inlet and outlet ports for filtering all of the fluid flowing therebetween only after said primary filter element becomes clogged with contaminants, separator means interposed between said primary and secondary filter elements for preventing communication therebetween, a single bypass valve member interposed between said inlet and outlet ports and operatively connected to said primary and secondary filter elements, said bypass valve member having a first position for permitting flow from said inlet port to said outlet port via said primary filter element, a second position for permitting flow from said inlet port to said outlet port via said secondary filter element after said primary filter element becomes clogged with contaminants, and a third position for permitting flow from said inlet port to said outlet port without passing through either the primary filter element or the secondary filter element after both elements become clogged with contaminants, indicator means operatively connected to said bypass valve member for indicating the clogged condition of said primary and secondary filter elements, said indicator means having a non-signalling first position which occurs when said bypass valve member is in its first position, a signalling second position which occurs when said bypass valve member has moved to its second position, and a signalling third position which occurs when said bypass valve member has moved to its third position, and means for causing said indicator means to move from said non-signalling to said signalling positions upon movement of said bypass valve member from its first position to its second and third positions.

2. A fluid filter comprising a housing having an inlet port and an outlet port, a fixed substantially cylindrical primary filter element interposed between said inlet and outlet ports for filtering all of the fluid flowing therebetween, a fixed substantially cylindrical secondary filter element interposed between said inlet and outlet ports for filtering all of the fluid flowing therebetween only after said primary filter element becomes clogged with contaminants, partition means interposed between said primary and secondary filter elements for preventing communication therebetween, a bypass valve body interposed between said inlet and outlet ports and operatively connected to said primary and secondary filter elements, said bypass valve body having a first passage for bypassing said primary filter element and communicating said inlet port with said outlet port via said secondary filter element and a second passage for bypassing both said primary and secondary filter elements and permitting direct communication between said inlet and outlet ports, a single valve member movable within said valve body upon the exertion of a predetermined filter inlet pressure thereon, spring means for opposing movement of said valve member, said valve member having a first position for preventing flow through said first and second passages of said valve body, a second position for permitting flow through said first passage but preventing flow through said second passage, and a third position for permitting flow through said second passage, indicator means operatively connected to said valve member for indicating the position of said valve member, said indicator means having a non-signalling first position which occurs when said valve member is in its first position, a signalling second position which occurs when said valve member has moved to its second position, and a signalling third position when said valve member has moved to its third position, and means for causing said indicator means to move from said non-signalling to said signalling positions upon movement of said valve member from its first position to its second and third positions.

3. A fluid filter comprising a housing having an inlet port and an outlet port, a fixed substantially cylindrical primary filter element interposed between said inlet and outlet ports for filtering all of the fluid flowing therebetween, a fixed substantially cylindrical secondary filter element interposed between said inlet and outlet ports for filtering all of the fluid flowing therebetween only after said primary filter element becomes clogged with contaminants, partition means interposed between said primary and secondary filter elements for preventing communication therebetween, a guide member extending from said housing, said guide member having a bore therein, a bypass valve body interposed between said inlet and outlet ports and operatively connected to said primary and secondary filter elements, said bypass valve body having an annular shape which surrounds said guide member, a first passage located in said valve body for bypassing said primary filter element and communicating said inlet port with said outlet port via said secondary filter element, a second passage located in said valve body for bypassing both said primary and secondary filter elements and permitting direct communication between said inlet and outlet ports, a valve member located between said valve body and guide member and movable upon the exertion of a predetermined filter inlet pressure thereon, said valve member having a tubular portion with a stepped diameter bore which surrounds said guide member and is slidable thereon, said valve member having a first position for preventing flow through said first and second passages of said valve body, a second position for permitting flow through said first passage but preventing flow through said second passage, and a third position for permitting flow through said second passage, a movable sleeve surrounding said guide member and having a stepped bore formed therein, spring means located between said sleeve and said tubular portion of said valve member for opposing movement of said valve member, an indicator pin located in the bore of said guide member, means for causing said indicator pin to move from a non-signalling to a signalling position upon movement of said valve member from its first position to its second and third positions, first restraining means operatively connected to said tubular portion of said valve member and said indicator pin for maintaining said indicator pin in a non-signalling first position when said valve member is in its first position, second restraining means operatively connected to said tubular portion of said valve member and said indicator pin for maintaining said indicator pin in a signalling second position when said valve member has moved to its second position and released said first restraining means, third restraining means operatively connected to said indicator pin and said guide member for maintaining said indicator pin in a signalling third position when said valve member has moved to its third position and released said first and second restraining means, fourth restraining means operatively connected to said sleeve and said guide member for preventing movement of said sleeve until after said indicator pin has moved to its signalling second position, and fifth restraining means operatively connected to said sleeve and said guide member for preventing further movement of said sleeve until after said indicator pin has moved to its signalling third position.

4. A clogged filter indicator for use in a fluid filter device having a substantially cylindrical primary filter element for normally filtering all of the fluid flowing through said device and a substantially cylindrical secondary filter element for filtering said fluid only after said substantially cylindrical primary filter element becomes clogged with contaminants comprising an indicator housing having a bore therein, an indicator pin slidable in said bore, a pressure responsive member movable from a first position to a second position when said primary filter element becomes clogged with contaminants and from said second position to a third position when said secondary filter element becomes clogged with contaminants, said pressure responsive member having a tubular portion with a stepped bore which surrounds said indicator housing and is slidable thereon, a movable sleeve surrounding said indicator housing and having a stepped bore formed therein, spring means located between said sleeve and the tubular portion of said pressure responsive member for opposing movement of said pressure responsive member, means for causing said indicator pin to move from a non-signalling to a signalling position upon movement of said pressure responsive member from its first position to its second and third position, first restraining means operatively connected to said tubular portion of said pressure responsive member and said indicator pin for maintaining said indicator pin in a non-signalling first position when said pressure responsive member is in its first position, second restraining means operatively connected to said tubular portion of said pressure responsive member and said indicator pin for maintaining said indicator pin in a signalling second position when said pressure responsive member has moved to its second position and released said first restraining means, third restraining means operatively connected to said indicator pin and said indicator housing for maintaining said indicator pin in a signalling third position when said pressure responsive member has moved to its third position and released said first and second restraining means, fourth restraining means operatively connected to said sleeve and said indicator housing for preventing movement of said sleeve until after said indicator pin has moved to its signalling second position, and fifth restraining means operatively connected to said sleeve and said indicator housing for preventing further movement of said sleeve until after said indicator pin has moved to its signalling third position.

References Cited by the Examiner
UNITED STATES PATENTS

| | | | |
|---|---|---|---|
| 2,617,535 | 11/52 | Hamilton | 210—132 |
| 2,936,731 | 5/60 | Rosaen | 210—90 |
| 2,954,751 | 10/60 | Barnes | 116—70 |
| 2,998,138 | 8/61 | Mould | 210—90 |
| 3,000,505 | 9/61 | Scavuzzo | 210—315 |
| 3,080,058 | 3/63 | Rosaen | 210—90 |

REUBEN FRIEDMAN, *Primary Examiner.*

HERBERT L. MARTIN, *Examiner.*